United States Patent [19]
Mason

[11] 3,857,639
[45] Dec. 31, 1974

[54] ELECTRONIC TARGET

[75] Inventor: Mark T. Mason, South Lyndeboro, N.H.

[73] Assignee: New Hampshire Ball Bearings Inc., Peterborough, N.H.

[22] Filed: Dec. 21, 1973

[21] Appl. No.: 427,372

[52] U.S. Cl................ 356/156, 33/290, 33/293, 250/201, 250/239, 356/172
[51] Int. Cl.................. G01b 11/26, G01j 1/20
[58] Field of Search............ 356/153, 172, 4, 156; 33/290, 293; 250/239, 201

[56] References Cited
UNITED STATES PATENTS
3,462,845 8/1969 Matthews.................. 33/290
3,469,919 9/1969 Zellner.................... 356/172
3,527,539 9/1970 Studebaker................ 356/156

FOREIGN PATENTS OR APPLICATIONS
1,542,795 9/1968 France..................... 33/293

Primary Examiner—James W. Lawrence
Assistant Examiner—T. N. Grigsby
Attorney, Agent, or Firm—Thomas N. Tarrant

[57] ABSTRACT

A target for a positional reference light beam, the target being mounted on a pole for movement along the pole until it acquires the reference beam. A combination of optics and electronics distinguishes the desired reference beam from sunlight or other optical disturbances and activates both audible and visible indicators of acquisition.

4 Claims, 7 Drawing Figures

3,857,639

ELECTRONIC TARGET

BACKGROUND OF THE INVENTION

1. Field of the Invention

The invention relates to construction instrumentation and in particular to targets for reference beams used to establish horizontal and vertical reference planes.

2. Description of the Prior Art

Until recently, some form of transit assisting the human eye was the principal means of determining reference planes in construction work.

Over the past five years, laser beams have been utilized increasingly to replace the human eye in the transit. However, the laser beam must still be detected at the various points where the reference is to be utilized. Commonly a target of some sort is situated so that it will be illuminated by the laser beam. The human eye again comes into play to note the illuminated location on the target. While it has been recognized that some form of automatic indicating target is desirable, a host of problems are encountered.

In outdoor construction areas, ambient sunlight is likely to activate almost any light responsive device. Reference beams are difficult to acquire with a tight aperture and large apertures do not permit precise measurement. Still a further constant problem with all construction instrumentation is the need of rugged and reliable construction. The quick answers to the above problems encounter the still further problem of high cost.

SUMMARY OF THE INVENTION

In accordance with the present invention an electronic target is provided that rejects extraneous radiation, is relatively simple and rugged in construction and provides a high degree of accuracy while having an initial wide acquisition angle.

The inventive target rejects extraneous radiation with an optical bandpass filter together with an electronic high pass filter for discriminating against continuous ambient radiation. A timing circuit extends the duration of each acquired pulse to drive audio and visual indicators for convenient time intervals. A large aperture objective lens readily acquires a scanning beam and is used with a narrow masking aperture to obtain precise positioning. The target is preferably mounted on a pole such as a surveyor's pole and includes a frictional drive wheel which is rotated manually or electrically to drive the target along the pole to the point of acquisition.

Thus it is an object of the invention to provide a novel electronic target for acquiring reference plane scanning beams.

It is a further object of the invention to provide a self-powered beam-seeking target for laser transits.

It is still a further object of the invention to provide a novel method of establishing a reference point in the plane of a scanning beam in which a detector is moved toward the plane of the beam until it responds with an acquisition signal.

Further objects and features of the invention will be understood upon reading the following description together with the drawing.

DESCRIPTION OF THE PREFERRED EMBODIMENT

Figure 1:
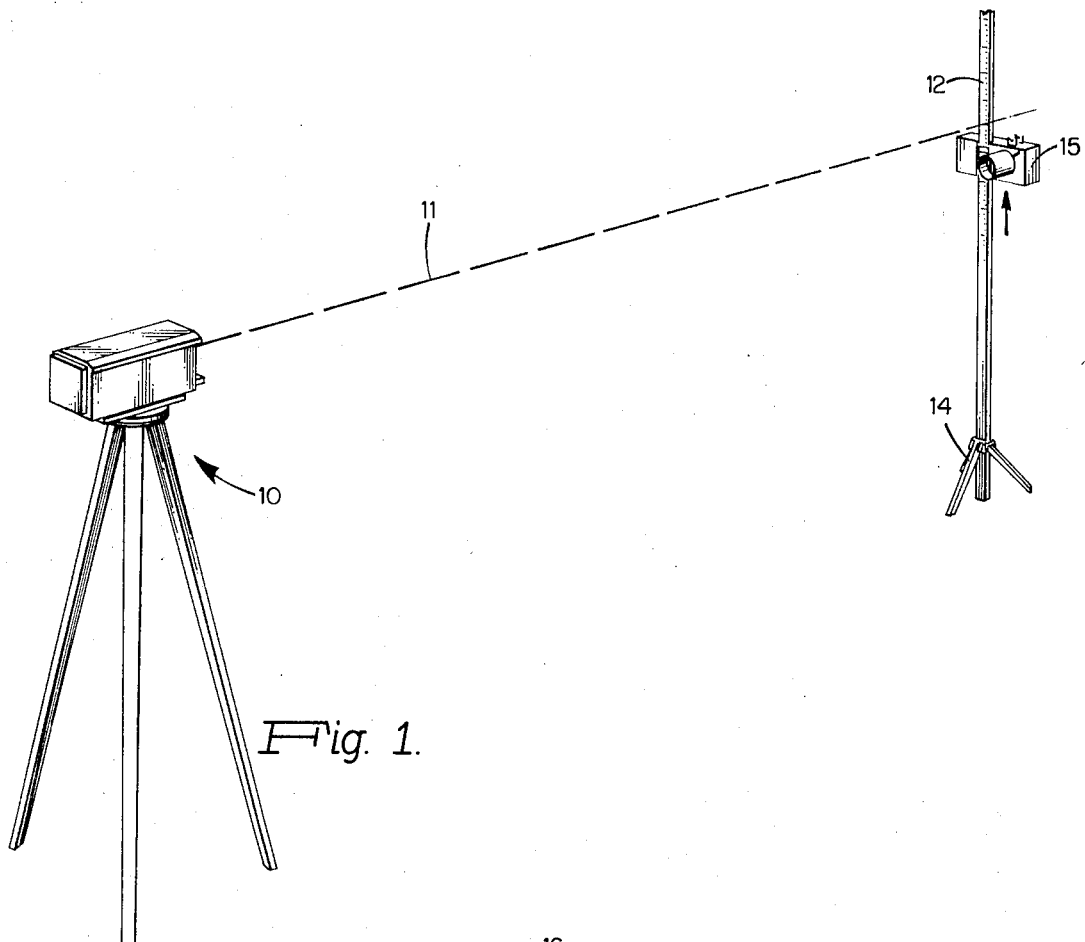
FIG. 1 is a diagrammatic illustration showing use of the inventive target together with a laser transit.

While small and simple in operation, the electronic target according to the invention has four basic components. Each of these components presents its own problems. They are: the drive mechanism for moving the target along a supporting pole; the optical system for detecting a reference beam; the electronic circuit for processing the detected signal; and, the indicators. These four components will be described in sequence, but first, FIG. 1 depicts a usual utilization.

Light source 10 provides a narrow scanning beam of light defining a reference plane. Commonly lasers are used since they provide a readily controllable small angle beam with a distinctive narrow spectral output. Thus source 10 is commonly referred to as a laser transit and includes an adjustable support for establishing the position of the reference plane. In contouring land for highways and airports or in constructing buildings, this reference plane is utilized at widely scattered positions while the laser transit remains stationary. At the desired positions, targets are erected and the location of the laser beam, as it scans past is noted and sometimes marked. In FIG. 1, the scanning beam of source 10 is depicted by dashed line 11. At a desired utilization position, surveyors pole 12 is fixed. Pole 12 may be supported on stand 14 or, more commonly, hand held. Target 15, according to the invention, is mounted on pole 12 and contains drive means for electrically or manually driving it up and down pole 12. In practice it is positioned below the scanning beam and driven upwardly until the beam is acquired. When target 15 is electrically driven, it stops automatically. When manually driven, the operator stops movement on perceiving an acquisition signal.

Figure 2:
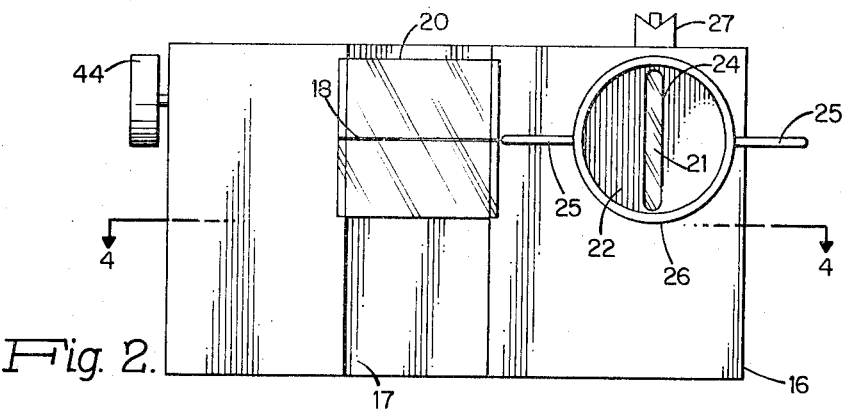
FIG. 2 is a front elevation of the inventive target.

FIGS. 2-5 show the housing and drive component of target 15. FIG. 2 shows the target in front elevation with housing 16 and guide way 17 for pole 12 (FIG. 1). Fiducial mark 18 is supported on the front face of guide way 17 by transparent material 20 of glass or clear plastic. Optical objective 21 is substantially concealed behind rotatable mask 22 having slot aperture 24. Aperture 24 is rotatable by projecting pins 25 serving as handles. Mask 22 is supported by projecting cylindrical sleeve 26. On top of housing 16 aligned over the optical axis of objective 21 are sights 27 to aid in directing the target at source 10 (FIG. 1).

Figure 3:
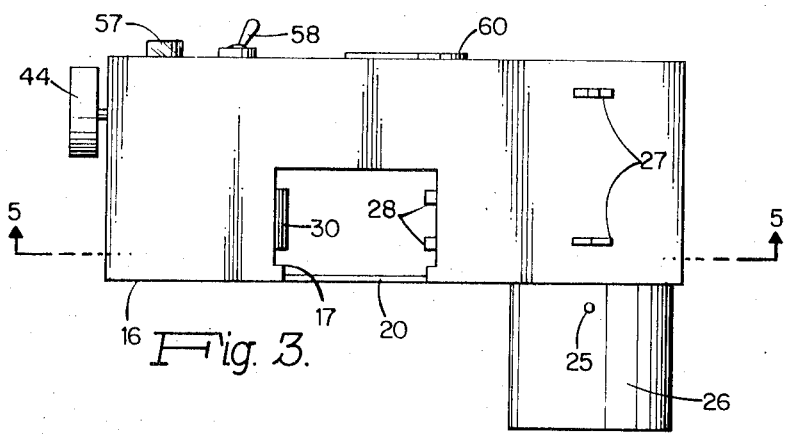
FIG. 3 is a plan view of the inventive target.
Figure 4:
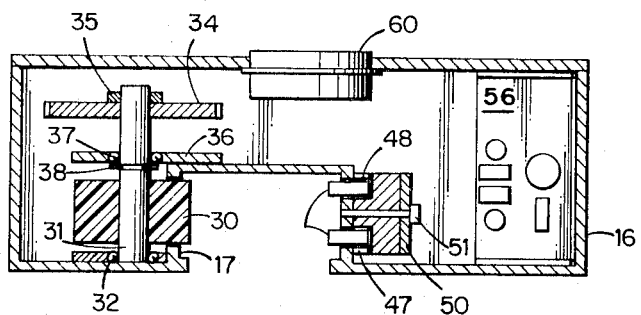
FIG. 4 is a sectional view of the target taken along 4—4 of FIG. 2.

Guide way 17 is depicted better in plan view FIG. 3. Small wheels, or bearings 28 project from the right side of guide way 17 under spring pressure. High friction roller 30 projects from the left side of guide way 17. Referring now to FIG. 4 it will be seen that roller 30 is mounted on shaft 31. Shaft 31 is supported at the front end by ball bearing ring 32. Roller 30, made of rubber or a synthetic rubber-like material, is force fit over shaft 31. Mounted at the rear of shaft 31 is pinion gear 34 secured by fastening nut 35. Support plate 36, mounted on the rear of guide way 17, carries bearing ring 37 supporting shaft 31. Circlip 38 on shaft 31 forward of bearing ring 37 prevents rearward movement of shaft 31. Housing 16 blocks forward movement of shaft 31.

Figure 5:
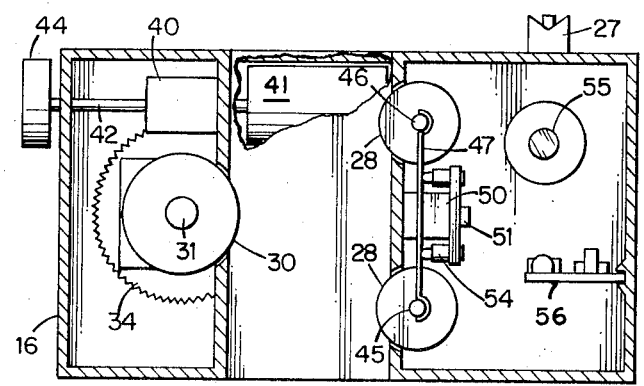
FIG. 5 is a sectional view of the target taken along 5—5 of FIG. 3.

In FIG. 5 it will be seen that pinion gear 34 passes within housing 40 containing a worm gear (not shown). The worm gear is connected to electric motor 41. Connected to the worm gear and extending through housing 16 is shaft 42. On the outside of housing 16, manual knob 44 connects to shaft 42 for manual operation and fine adjustment.

Wheels 28 are mounted in pairs on two floating axles 45 and 46. The front ends of axles 45 and 46 are urged toward guide way 17 by bridge member 47. The back ends of axles 45 and 46 are urged toward guide way 17 by bridge member 48. Support block 50 is mounted inside housing 16 on the right wall of guide way 17 by machine screw 51. Support block 50 carries four spring-loaded ball thrust bearings 54 contacting bridge members 47 and 48 and urging them and thus wheels 28 into guide way 17.

Interference filter 55 behind objective lens 21 shows in FIG. 5. Circuit board 56 carrying the electronic circuitry is depicted at the right side of FIGS. 4 and 5.

FIG. 3 depicts indicator light 57 and on-off switch 58 at the rear of housing 16. Sonic indicator 60 is depicted at the central rear of housing 16 in FIGS. 3 and 4.

Figure 6:
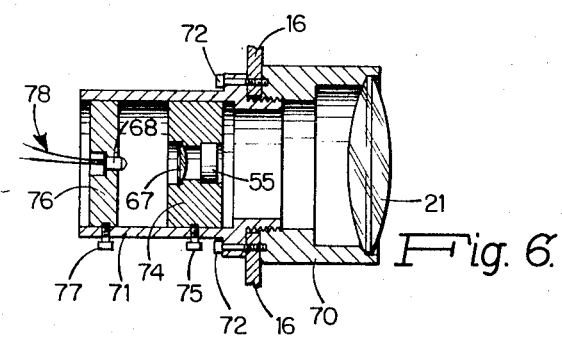
FIG. 6 is a sectional view of the optical assembly of the target.

The optical assembly as depicted in FIG. 6 consists basically of objective lens 21, optical interference filter 55, field lens 67 and photodiode 68. Lens 21 is desirably large enough in diameter to intercept two scans of the scanning reference beam while the target is moving. With a scan rate of one cycle per sec. and a target climb rate of 4 cm per sec., lens 21 is suitably about 6 cm in diameter. This allows that either two scans will be intercepted, one near the bottom and one near the top, or one scan will be intercepted near the center of the lens. It will be recognized that with higher scan rates and/or lower target climb rates, lens 21 may be smaller.

Interference filter 55 is a conventional interference bandpass filter designed to pass only the spectrum of the reference beam. Since most reference beam sources available for the present application use helium-neon lasers, a very narrow bandpass filter centered at 633 nm wavelength is suitable. The exact filter characteristics are not critical and are resolved on a tradeoff of cost, optical efficiency and signal-to-noise ratio.

Field lens 67 focuses the light from lens 21 onto photodiode 68.

Lens 21 is mounted in lens holder 70 exterior to housing 16. Cylindrical casing 71 on the interior of housing 16 is screwed to lens holder 70 through housing 16 by screws 72. Filter 55 and lens 67 are cemented into a plastic block 74 which is secured in casing 71 by set screw 75. Photodiode 68 is cemented in second plastic block 76 held in casing 71 by second setscrew 77. Leads 78 from photodiode 68 connect to amplifier 81 (see FIG. 7). Cylindrical sleeve 26 (FIG. 3) slips over the outside of lens holder 70.

Figure 7:
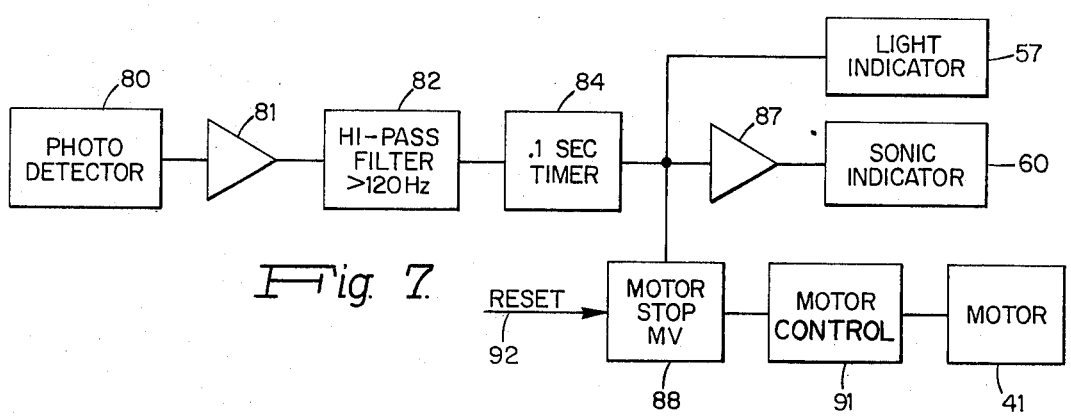
FIG. 7 is a block diagram of the electronic circuit in the inventive target.

The electronic assembly, while not as simple as might at first be expected, utilizes conventional components and thus is shown only by simplified block diagram in FIG. 7. The power sources are conventional and will depend to some extent on the specific choice of components and thus are not illustrated. Either batteries or line current may be used.

Photodetector 80 is suitably photodiode 68 of FIG. 6. High voltage amplification is desired since the output of detector 80 will normally be quite low. Thus amplifier 81 is suitably an operational amplifier with a gain of about 1000. Since bandpass filter 55 will not block sunlight (which emits across the entire visible band), highpass filter 82 is connected to the output of amplifier 81. Sunlight will be present as a dc level while the desired scan signal will appear as pulses having a frequency characteristic of rise and fall determined by the scan speed and the size of the optical aperture. While blocking dc alone can take care of ambient sunlight, it has been found worthwhile to pass only frequencies of above 120 hz or even better 180 hz so as to avoid sensitivity to passing shadows and the more prominent AC power frequencies.

The output of filter 82 is connected to timer 84. Timer 84 may be a monostable multivibrator or an integrated circuit timer such as the 555 timer available from Signetics, Sunnyvale, Calif. Timer 84 is triggered by the short pulse amplified from detector 80 and provides and extended output shorter than the scan repetition rate of the reference beam but long enough to energize visual and sonic indicators for reasonable human perception intervals. A one tenth second output has been found suitable. A light emitting diode (LED) can be operated directly from a 555 timer, and is suitably connected as light indicator 57 to the output of timer 84. Since light indicator 57 is not readily seen in bright ambient light, sonic indicator 60 is also preferably included. While sonic indicators with very low power requirements are available, depending on the power output capacity of timer 84, an additional amplifier 87 may be required. It will be understood that sonic indicator 60 is of the type that generates its own audio frequency on the application of a dc voltage.

The output of timer 84 is also connected to motor stop multivibrator 88. In one embodiment, multivibrator 88 is a 555 timer connected to operate as a monostable multivibrator turning motor 41 OFF through motor control 91 and then after a timed interval (i.e., 3 minutes) turning it back on again. For this use motor 41 starts when a power switch is turned on and it is assumed the power switch is turned off within three minutes after acquisition. Alternatively, as shown, multivibrator 88 may be a bistable multivibrator or flip-flop that turns motor 41 off when triggered by timer 84. The depicted multivibrator 88 thus has a reset input 92 for restarting motor 41. Motor control 91 is suitably a power transistor through which the current to motor 41 passes.

For operation, scanning reference plane beacon 10 is set up to scan in the desired plane. In a location at which it is desired to detect the scanned plane, surveyor's (story) pole 12 is set up with target 15 positioned below scanning beam 11. The operator, using sights 27, aligns the target toward the support of beacon 10 and turns on switch 58. The target commences climbing the pole. For this purpose aperture 24 in front of lens 21 is aligned vertically. When the target acquires the scanning beam, it stops and indicators 57 and 60 indicate with every pass of beam 11. For greater accuracy, aperture 24 is then rotated by handles 25 to the horizontal position. If indicators 57 and 60 fail to continue indicating, then manual control knob 44 is rotated until indications resume. The height of the scanned reference plane can be read off calibrations on the surveyors pole.

While the invention has been described with relation to a specific embodiment, variations are contemplated as within the invention. For example, a simplified version for low portable power consumption is driven along the pole by a manual knob only. While knob 44 can serve this function, it will be understood that a different gear ratio is desirable from that used by a small electric motor and the motor itself is better omitted for manual use.

Also, while only vertical operation is described, the scanned reference plane may be a vertical or other plane so that the target must move on a horizontal or other track.

Thus, it is intended to cover the invention as set forth in the scope of the following claims.

I claim:

1. A target for detecting a plane of reference defined by a scanning light beam comprising:
   a. a housing containing a guide way for a pole;
   b. an electrically driven friction roller in said housing for propelling said housing along a pole in said guide way;
   c. optical means mounted in said housing for acquiring a scanning light beam; and,
   d. electronic means including indicators in said housing connected for halting said electrically driven friction roller and operating said indicators responsive to acquisition of a scanning light beam by said optical means.

2. A target for detecting a plane of reference defined by a scanning light beam comprising:
   a. a housing containing a guide way for a pole;
   b. a manual rotator driving a friction roller in said guide way for propelling said housing along a pole in said guide way, said manual rotator and friction roller being mounted in said housing;
   c. optical means mounted in said housing for acquiring a scanning light beam; and,
   d. electronic means including indicators in said housing connected for operating said indicators responsive to acquisition of a scanning light beam by said optical means.

3. A target for detecting a plane of reference defined by a scanning light beam comprising:
   a. a housing containing a guide way for a pole;
   b. drive means in said housing for propelling said housing along a pole in said guide way;
   c. optical means mounted in said housing for acquiring a scanning light beam, said optical means comprising a circular objective lens and a slot-aperture mask in front of said lens, said aperture being rotatable between a vertical position for coarse acquisition and a horizontal position for precision acquisition; and,
   d. electronic means including indicators in said housing connected for operating said indicators responsive to acquisition of a scanning light beam by said optical means.

4. A method of determining reference points comprising:
   a. establishing a reference plane with a narrow scanning beam of quasimonochromatic light;
   b. moving a detector substantially perpendicular to said plane until said beam is acquired;
   c. providing a wide aperture substantially perpendicular to said plane in front of said detector while so moving;
   d. sequentially to the above, providing a narrow aperture in place of said wide aperture and again moving said detector to acquisition; and,
   e. driving light and sonic indicators with the amplified output of said detector to indicate acquisition.

* * * * *